(12) United States Patent
Loewen et al.

(10) Patent No.: US 6,556,401 B1
(45) Date of Patent: Apr. 29, 2003

(54) CIRCUIT ARRANGEMENT FOR OVERLOAD PROTECTION

(75) Inventors: Klaus-Dieter Loewen, Balingen (DE); Matthias Reinhardt, Winnenden (DE)

(73) Assignee: DaimlerChrysler AG, Stuttgart (DE)

( * ) Notice: Subject to any disclaimer, the term of this patent is extended or adjusted under 35 U.S.C. 154(b) by 158 days.

(21) Appl. No.: 09/604,070

(22) Filed: Jun. 26, 2000

(30) Foreign Application Priority Data

Jun. 24, 1999 (DE) .......................................... 199 28 856

(51) Int. Cl.[7] ................................................. H02H 3/20
(52) U.S. Cl. .................... 361/91.1; 361/91.5; 307/10.1; 307/130
(58) Field of Search ............................ 361/54–57, 91.5, 361/100, 58, 91.1, 93.1, 78; 307/400, 10.1, 125, 130

(56) References Cited

U.S. PATENT DOCUMENTS 4,661,897 A  *  4/1987 Sato et al. ..................... 361/58
5,319,259 A  *  6/1994 Merrill ......................... 307/443

FOREIGN PATENT DOCUMENTS

| DE | 38 04 250 C1 | 7/1989 |
| DE | 44 09 971 C2 | 1/1996 |
| JP | 1-27400 | 8/1989 |
| JP | 8-289458 | 11/1996 |
| JP | 11-146635 | 5/1999 |

* cited by examiner

Primary Examiner—Kim Huynh
(74) Attorney, Agent, or Firm—Crowell & Moring LLP

(57) ABSTRACT

A circuit arrangement for overload protection, particularly for an evaluation electronics unit for child-seat detection in a vehicle, has first and second input connections for an input voltage signal, and first and second output connections for an output voltage signal. The first input connection and the first output connection are connected to one another by means of a first circuit path; and the source/drain path of a first field-effect transistor is included in a second circuit path from the second input connection to the second output connection, to block the second circuit path if an overvoltage is present. The source/drain path of a second field-effect transistor, is included in a third circuit path between the first circuit path and that connection of the first field-effect transistor which is coupled to the second input connection. The second field effect transistor completes the third circuit path when overvoltage is present between the first and the second input connection.

6 Claims, 2 Drawing Sheets

CIRCUIT ARRANGEMENT FOR OVERLOAD PROTECTION

BACKGROUND AND SUMMARY OF THE INVENTION

This application claims the priority of German patent document 199 28 856.9, filed Jun. 24, 1999, the disclosure of which is expressly incorporated by reference herein.

The invention relates to an overload protection arrangement for an electric circuit, which is particularly suitable for use in an evaluation electronics unit for child-seat detection in a vehicle. The protection arrangement according to the invention includes a first and a second input connection for an input voltage signal, and a first and a second output connection for an output voltage signal. The first input connection and the first output connection are connected to one another by means of a first circuit path, and the source/drain path of a first field-effect transistor is included in a second circuit path from the second input connection to the second output connection in order to block the second circuit path if an overvoltage is present.

A circuit arrangement of this generic type is disclosed in German patent document DE 38 04 250 C1 for current limiting in digital telephone terminals which are supplied via the subscriber line. The gate potential of the field-effect transistor there is equivalent to the potential difference between the connections of a parallel circuit comprising a transistor and a capacitor in series with a resistor via the two input connections. On the one hand, this arrangement limits the maximum level of a current flowing between the input and output connections of the circuit, while on the other hand, voltage spikes in a signal applied to the two input connections are damped and transferred to the output connections.

Circuit arrangements for overload protection having zener diodes are also known. In these, the voltage between two input connections is limited by short-circuiting these input connections through zener diodes connected back to back. If a threshold voltage appropriate to the zener diodes is exceeded, a short-circuit current flows between the input connections, so that electrical power is primarily dissipated in the zener diodes, and not in the load connected to the output connections.

Overload protection is desirable, for example, in devices for child-seat detection in motor vehicles, such as described in German patent document DE 44 09 971 C2. Such devices usually comprise a transmission and reception unit, accommodated in a vehicle seat, with an inductive antenna which has an associated resonator located in the child seat. The resonator can be combined with an intelligent identification medium operated by the energy drawn by the resonator from the electromagnetic radiation field. Because the operating frequency range of 125 kHz frequently used for child-seat detection overlaps the frequency range for keyless-go systems, it is desirable, particularly for a resonator in the child seat and also for intelligent identification media that may be coupled thereto, to assure protection against overvoltages such as can be caused by a keyless-go system.

The circuit arrangement used for overload protection should, on the one hand, protect against excessively high powers picked up from an electromagnetic interference field; and on the other hand, it should not significantly reduce the sensitivity of the resonator and of the possibly associated identification medium in the child seat, at least in a normal operating range. This means that only a very low leakage-current loss should occur in a normal operating range. These requirements are not fulfilled unsatisfactorily by circuit overload protection arrangements based on zener diodes.

The object of the invention is to provide an improved circuit overload protection arrangement of the type mentioned above, which has a high input resistance and a correspondingly low leakage-current loss.

This and other objects and advantages are achieved by the circuit arrangement according to the invention, in which a third circuit path (between the first circuit path and that connection of the first field-effect transistor which is coupled to the second input connection) includes the source/drain path of a second field-effect transistor. The latter completes the third circuit path if an overvoltage is present between the first and the second input connection. The gate connection of the first field-effect transistor is connected to a potential in the first circuit path between the first input connection; and the first output connection, and the gate connection of the second field-effect transistor is connected to a potential in the second circuit path between the second output connection and that connection of the first field-effect transistor which is coupled to the second output connection. This produces an overload protection circuit in which, in a normal operating range, only a very small leakage current flows, which is significantly below that in an equivalent circuit based on zener diodes. In addition, the field-effect transistor in the circuit path between the second input connection and the second output connection causes the voltage between the output connections to be advantageously stabilized.

In one embodiment of the invention, the first field-effect transistor is a depletion-mode n-channel MOSFET or an n-channel field-effect transistor, and the second field-effect transistor is an enhancement-mode p-channel MOSFET. This permits a positive potential difference between the second and the first input connection to be limited to a positive threshold value.

In another embodiment of the invention, the first field-effect transistor is a depletion-mode p-channel MOS field-effect transistor or a p-channel field-effect transistor, and the second field-effect transistor is an enhancement-mode n-channel MOSFET. This permits a negative potential difference between the second and the first input connection to be limited to a negative threshold value, so that the potential difference on the output connections does not fall below this threshold value.

In still another embodiment of the invention, the source/drain path of a third field-effect transistor is connected in parallel with the second field-effect transistor. This short-circuits the first and the second input connection if an overvoltage is present, the gate potential of the third field-effect transistor being equivalent to the voltage drop for the current flowing through the second field-effect transistor across a resistor. This arrangement permits a potential difference between the output connections to be limited, when an overvoltage is present on the input connections, such that the short-circuit current between the input connections rises very steeply as a function of the voltage between the input connections if the voltage applied between the input connections enters an overvoltage range.

Finally, in a further embodiment of the invention, the circuit arrangement is integrated in an ASIC module. This achieves a robust and compact design for the circuit arrangement with a low space requirement.

Other objects, advantages and novel features of the present invention will become apparent from the following detailed description of the invention when considered in conjunction with the accompanying drawings.

DETAILED DESCRIPTION OF THE DRAWINGS

Figure 1:
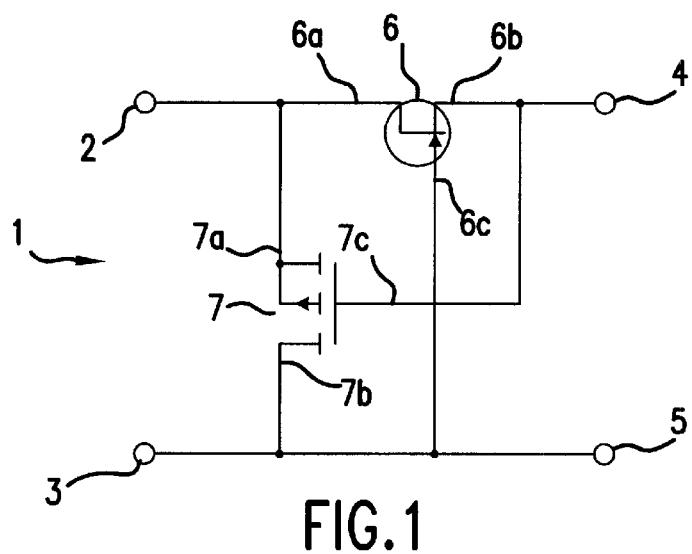
FIGS. 1 and 2 are circuit diagrams of respective circuit arrangements for overload protection.

FIG. 1 shows a first illustrative embodiment 1 of a circuit arrangement for overload protection which transfers a voltage level present between two input connections 2, 3 to two output connections 4, 5 if the potential at the input connection 2 is positive relative to the potential on the input connection 3. Connected in the circuit path between the input connection 2 and the output connection 4 is an n-channel field-effect transistor 6 whose drain connection 6a is associated with the input connection 2 and whose source connection 6b is associated with the output connection 4. The gate connection 6c of the n-channel field-effect transistor 6 is connected to a potential in the circuit path between the input connection 3 and the output connection 5 of the circuit arrangement. If the potential difference between the input connection 2 and the input connection 3 exceeds a positive threshold value, the n-channel field-effect transistor 6 interrupts the circuit connection between the input connection 2 and the output connection 4. This protects the output connection 4 against an overvoltage, and a stabilized output voltage is produced between the output connections 4 and 5.

The circuit arrangement 1 also includes an enhancement-mode p-channel MOSFET 7, whose source and drain connections 7a, 7b short circuit the input connections 2 and 3. In this arrangement, the gate connection 7c of the p-channel MOSFET 7 is connected to a potential which is equivalent to that on the source connection 6b of the n-channel field-effect transistor 6. Thus, when the n-channel field-effect transistor 6 is turned off, a potential difference develops between the source connection and the gate connection 7a, 7c on the enhancement-mode p-channel MOSFET 7, and this potential difference turns the latter on when a threshold value is exceeded. When MOSFET 7 is on, short-circuit current flows between the input connections 2 and 3 of the circuit arrangement 1 and relieves the load on the n-channel field-effect transistor 6. It should be noted that the illustrative embodiment shown in FIG. 1 can be modified so that the source connection 6b of the n-channel field-effect transistor 6 is connected to the input connection 2, and the drain connection 6b of the n-channel field-effect transistor 6 is connected to the output connection 4, without the function of the circuit arrangement being changed in the process. It is also possible to replace the n-channel field-effect transistor 6 with a depletion-mode n-channel MOSFET.

Figure 2:
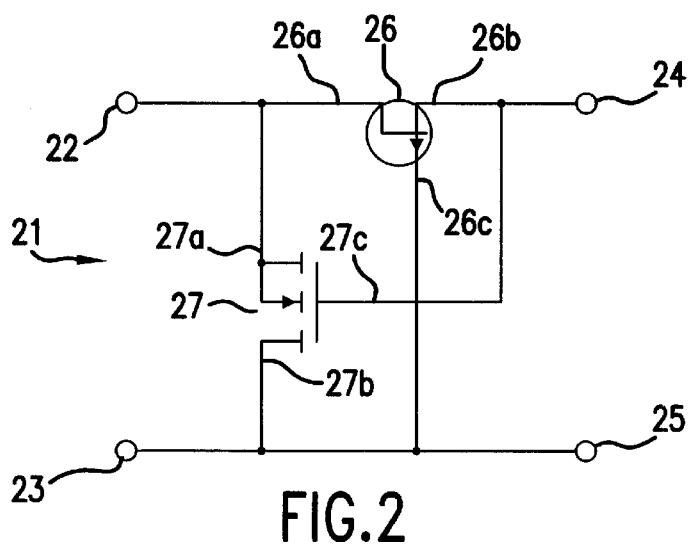

FIG. 2 shows a second illustrative embodiment of a circuit arrangement 21 for overload protection, in which a voltage level present between two input connections 22, 23 is transferred with voltage limitation to two output connections 24, 25 if the potential at the input connection 22 is negative relative to that of the input connection 23. Connected in the circuit path between the input connection 22 and the output connection 24 is a p-channel field-effect transistor 26, whose drain and source connections 26a and 26b are connected to the input connection 22 and to the output connection 24, respectively, as in the illustrative embodiment shown in FIG. 1. The gate connection 26c of the p-channel field-effect transistor 26 is in turn connected to a potential on the circuit connection between the input connection 23 and the output connection 25, so that, if the potential difference between the input connection 22 and the input connection 23 exceeds a negative threshold value, the p-channel field-effect transistor 26 interrupts the circuit connection from the input connection 22 to the output connection 24, thus protecting the output connection 24 against an overvoltage and producing a stabilized output voltage between the output connections 24 and 25.

The circuit arrangement 21 is also provided with an n-channel MOSFET 27, whose source and drain electrodes 27a and 27b are connected to the input connections 22 and 23, respectively. The gate connection 27c of the enhancement-mode n-channel MOSFET is connected to the potential on the source connection 26b in the n-channel field-effect transistor 6. Thus, when the p-channel field-effect transistor 26 is turned off, a potential difference develops between the source connection and the gate connection 27a, 27c on the enhancement-mode n-channel MOSFET 27, and this potential difference turns on the latter when a threshold value is exceeded. The p-channel field-effect transistor 26 is then relieved of load, and a short-circuit current flows between the input connections 22 and 23. It should be noted that, as in the illustrative embodiment shown in FIG. 1, the circuit arrangement for overload protection shown in FIG. 2 can be modified by replacing the p-channel field-effect transistor 26 with a depletion-mode p-channel MOSFET, without changing the basic manner of operation.

Figure 3:
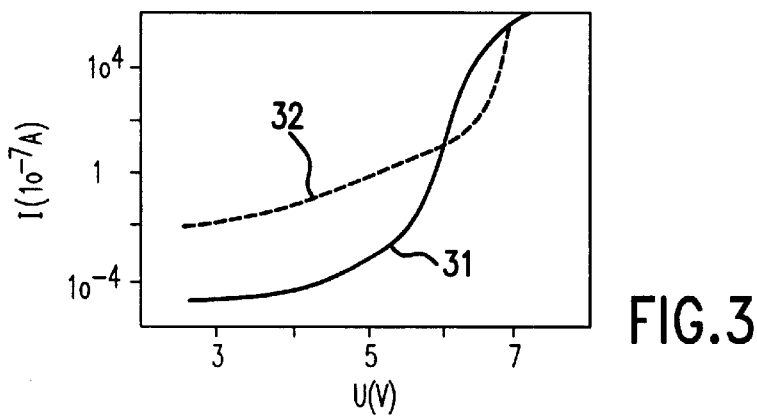
FIG. 3 shows a curve which is representative of short-circuit current between the input connections of the circuit arrangement shown in FIG. 1 as a function of a voltage difference applied at the input.

In FIG. 3, the curve 31 shows a typical dependency of leakage or short-circuit current flowing between the input connections 2 and 3 as a function of the potential difference applied thereto, for the circuit arrangement for overload protection 1 shown in FIG. 1. The n-channel field-effect transistor 6 in the circuit arrangement on which the curve 31 is based is, by way of example, a BF246-type n-channel field-effect transistor, and the enhancement-mode p-channel MOSFET 7 is a BS250-type enhancement-mode p-channel MOSFET. If a current of 0 to 10 mA is drawn at the output connections 4 and 5, the n-channel field-effect transistor 6 then causes a relative stabilization of the output voltage in a range of less than 10%. It should be noted that the overload protection current 21 in FIG. 2 can be used to achieve a corresponding short-circuit current, with only the mathematical sign of the potential difference between the input connections being reversed as compared with FIG. 1.

FIG. 3 also shows a dashed curve 32 corresponding to the short-circuit current in a circuit arrangement for overload protection which is based on two 6.8-volt zener diodes connected back to back. It can be seen that, in an identical range of the potential difference between the input connections, the circuit arrangements 1 and 21 from FIGS. 1 and 2, respectively, have a leakage current which is lower by more than two orders of magnitude than that in the circuit arrangements based on zener diodes. It should also be noted here that, when zener diodes are used which have a relatively low breakdown voltage as compared with circuit arrangements for overload protection which are of equivalent design, as shown in FIG. 1 or 2, the leakage current increases further.

Figure 4:
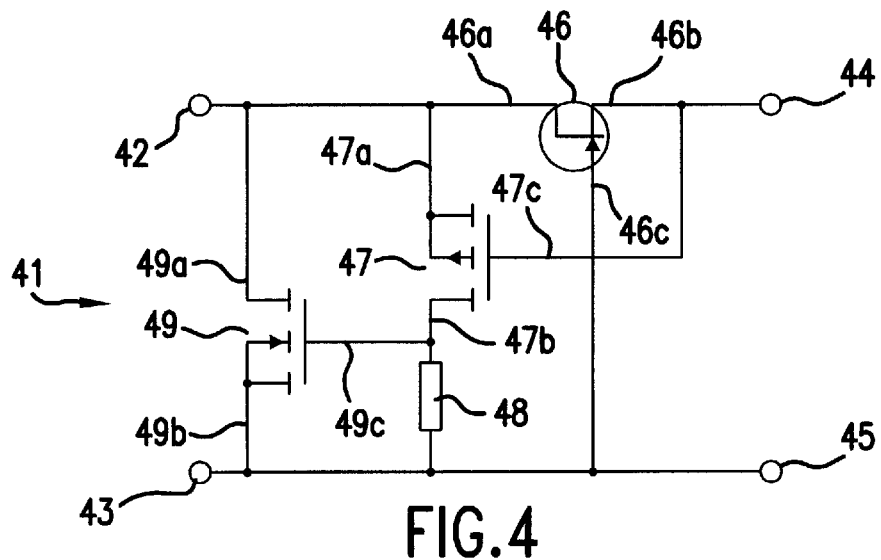
FIG. 4 is a circuit diagram of a further illustrative embodiment of a circuit arrangement for overload protection according to the invention.

FIG. 4 shows a third illustrative embodiment 41 for a circuit arrangement for overload protection, which is used to transfer a positive potential difference, present between two input connections 42, 43, with voltage limitation to output connections 44, 45. As in the illustrative embodiment shown in FIG. 1, an n-channel field-effect transistor 46 is connected in the circuit path between the input connection 42 and the output connection 44. Drain connection 46a of the transistor is associated with the input connection 42, and its source connection 46b is connected to the circuit path leading to the output connection 44. The gate connection 46c of the n-channel field-effect transistor 46 is connected to a potential in the circuit path between the input connection 43 and the output connection 45, so that, if the potential difference between the input connection 42 and the input connection 43 exceeds a positive threshold value, the n-channel field-effect transistor 46 interrupts the circuit path between the input connection 42 and the output connection 44. Thus, the output connection 44 is protected against an overvoltage and a stabilized output voltage is provided between the output connections 44 and 45.

As in the illustrative embodiments shown in FIGS. 1 and 2, the input connections 42 and 43 are short-circuited via source and drain electrodes 47a, 47b of an enhancement-mode p-channel MOSFET 47 and a resistor 48 connected to the drain connection 47b of the enhancement-mode p-channel MOSFET 47. In this arrangement, the gate connection 47c of the enhancement-mode p-channel MOSFET 47 is connected to a potential which is equivalent to that on the source connection 46b of the n-channel field-effect transistor 46. As a result, when the n-channel field-effect transistor 46 is turned off with an overvoltage present between the input connections 42 and 43, a potential difference develops between the source connection and the gate connection 47a, 47c on the enhancement-mode p-channel MOSFET 47. This potential difference turns on the latter when a threshold value is exceeded, so that a short-circuit current flows through said enhancement-mode p-channel MOSFET 47 and the resistor 48. This short-circuit current produces a voltage drop across the resistor 48, which voltage drop is used to control the gate potential of a third enhancement-mode n-channel MOSFET 49 on a gate connection 49c. The drain connection 49a of this enhancement-mode n-channel MOSFET 49 is connected to the input connection 42 of the circuit arrangement 41, and the source connection 49b of the enhancement-mode n-channel MOSFET 49 is connected to the input connection 43. The enhancement-mode n-channel MOSFET 49 is thus connected in parallel with the enhancement-mode p-channel MOSFET 47. If the enhancement-mode n-channel MOSFET 49 turns on, the input resistance of the circuit arrangement 41 falls immediately, so that the voltage between the output connections 44 and 45 is limited.

It should be noted that the n-channel field-effect transistor 46 can also be a depletion-mode n-channel MOSFET, without altering the basic operation of the circuit arrangement 41. It should also be pointed out that the illustrative embodiment shown in FIG. 4 can easily be modified for a voltage limitation of negative input voltages between the input connections 42 and 43, by replacing the n-channel field-effect transistor 46 with a p-channel field-effect transistor or depletion-mode p-channel MOSFET and using an enhancement-mode n-channel MOSFET instead of the enhancement-mode p-channel MOSFET 47, and an enhancement-mode p-channel MOSFET instead of the enhancement-mode n-channel MOSFET 49.

Figure 5:
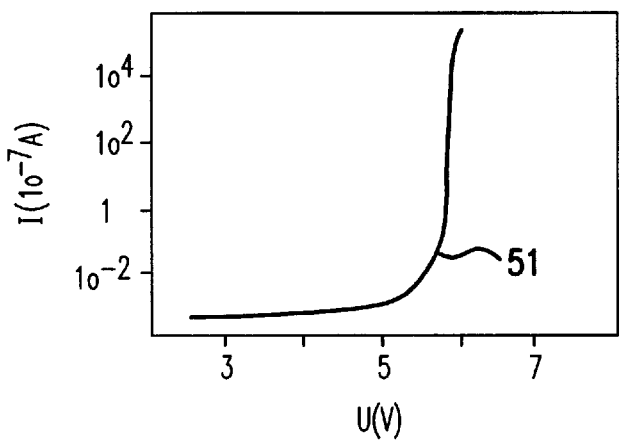
FIG. 5 shows a curve typical of the short-circuit current between the input connections of the circuit arrangement shown in FIG. 4, as a function of a voltage difference applied thereto.

In FIG. 5, the curve 51 shows a typical dependency of the leakage or short-circuit current flowing between the input connections 42 and 43 of the circuit arrangement 41 in FIG. 4, as a function of the potential difference present between the respective connections. In this case, the n-channel field-effect transistor 46 is, by way of example, a BF246-type n-channel field-effect transistor, the enhancement-mode p-channel MOSFET 47 is a BS250-type enhancement-mode p-channel MOSFET and the enhancement-mode n-channel MOSFET 49 is a BS170-type enhancement-mode n-channel MOSFET. The resistor 48 has the value R=22 MW, for example.

It is evident that, according to the choice of resistor R, the leakage current in the normal voltage range is somewhat larger than that in the illustrative embodiments shown in FIGS. 1 and 2. However, when it crosses into the range in which the input voltage is to be limited, the current flowing between the input connections rises very steeply. Even in comparison with an overload protection circuit based on zener diodes, (for example having 6.8-volt zener diodes), a leakage current which is smaller by a factor of 20 can still be achieved in the normal voltage range, in which the input voltage between the input connections 42 and 43 is to be transferred unadulterated to the output connections 44 and 45, while, at the same time, the short-circuit current rise has a relatively steep gradient in the voltage range in which the voltage difference between the output connections is to be limited.

Advantageously, the circuit arrangements shown in FIGS. 1, 2 and 4 are ASIC modules, possibly as an integral component of the circuits requiring voltage limitation.

On the whole, it should be stated that the overload protection circuits 1, 21 and 41 shown in FIGS. 1, 2 and 4, respectively, can be used to achieve a leakage current which is smaller by a factor of 10 compared with circuit arrangements based on zener diodes having a breakdown voltage of above 5 V, and can achieve a leakage current which is smaller by a factor of $10^5$ compared with circuit arrangements based on zener diodes having a breakdown voltage of below 5 V.

Figure 6:
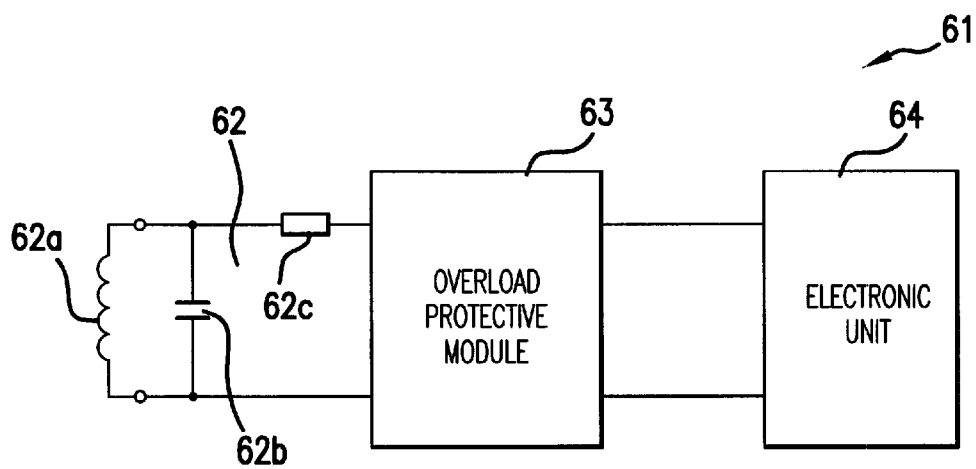
FIG. 6 shows a device for child-seat detection in a motor vehicle, containing a circuit arrangement for overload protection as shown in FIGS. 1, 2 or 4.

FIG. 6 shows an area of use for a circuit arrangement for overload protection designed in accordance with FIGS. 1, 2 or 4 in a child-seat detection circuit 61 accommodated in a child seat (not shown further) in a motor vehicle. This detection circuit 61 comprises a resonator circuit 62, arranged in the child seat, with an inductor 62a, a capacitor 62b and a resistor 62c, which is connected via an overload protection module 63 to a downstream resonator electronics unit 64 triggering the output of a child-seat detection signal on the basis of an electromagnetic signal picked up by the resonator circuit 62. In order to be able to dispense with an external voltage supply for the resonator electronics unit 64, the overload protection module 63 should be designed such that so little power is dissipated in it that the resonator electronics unit 64 can be operated with energy from the electromagnetic wave field. On the other hand, the overload protection module should be proportioned such that, even if the resonator circuit 62 is subjected to a very high-intensity electromagnetic wave field, the resonator electronics unit 64 is not damaged or destroyed. (In practice, such a high-intensity electromagnetic wave field can be produced if a child seat having a detection circuit 61 arranged on it is brought near to a keyless-go antenna arranged in the doors, which can occur when the child seat is fitted and removed.)

To protect the resonator electronics unit 64 against overload by energy from a high-intensity electromagnetic wave field, the electromagnetic resonant circuit 62 is coupled to the overload protection module 63, in which the AC voltage signal present on the terminals of the resonator circuit 62 is rectified and supplied to an overload protection circuit such as explained in connection with FIGS. 1, 2 or 4. In this arrangement, the polarity of the rectified AC voltage signal is taken into account accordingly. The small leakage currents in such an overload protection circuit make it possible, where appropriate, for even a relatively low-intensity electromagnetic wave field, which only weakly excites the resonator circuit 62, to be sufficient to operate the resonator electronics unit 63 and possibly trigger an appropriate child-seat detection signal. If, on the other hand, the leakage current in the overload protection module were too large, the energy from the electromagnetic wave field might sometimes no longer be sufficient to operate the resonator electronics unit 64.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A voltage overload protection circuit, comprising:
   first and second input connections for receiving an input voltage signal;
   first and second output connections for providing an output voltage signal;
   a first circuit path connecting the first input connection and the first output connection;
   a second circuit path between the second input connection and the second output connection, and including a source/drain path of a first field-effect transistor for blocking the second circuit path when an overvoltage is present;
   a third circuit path between the first circuit path and a connection of the first field-effect transistor which is coupled to the second input connection; and
   a second field-effect transistor having a source/drain path arranged in the third circuit path, which completes the third circuit path if an overvoltage is present between the first and the second input connection; wherein
      a potential in the first circuit path between the first input connection and the first output connection is input to a gate connection of the first field-effect transistor, whereby an overvoltage occurring at the input connections causes the first field-effect transistor to turn off; and
      a gate connection of the second field-effect transistor is connected to a potential in the second circuit path between the second output connection and a connection of the first field-effect transistor which is coupled to the second output connection, whereby said second field-effect transistor turns on in response to said first field-effect transistor turning off.

2. The overload protection circuit according to claim 1, wherein:
   the first field-effect transistor is one of a depletion-mode n-channel MOSFET and an n-channel field-effect transistor; and
   the second field-effect transistor is an enhancement-mode p-channel MOSFET.

3. The overload protection circuit according to claim 1, wherein:
   the first field-effect transistor is one of a depletion-mode p-channel MOSFET and a p-channel field-effect transistor; and
   the second field-effect transistor is an enhancement-mode n-channel MOSFET.

4. The overload protection circuit according to claim 1, further comprising a third field-effect transistor having a source/drain path connected in parallel with the second field-effect transistor, for short-circuiting the first and the second input connection if an overvoltage is present, wherein a gate potential of the third field-effect transistor is equivalent to a voltage drop for a current flowing through the second field-effect transistor across a resistor.

5. The overload protection circuit according to claim 1, wherein said circuit arrangement is integrated in an ASIC module.

6. A child seat detection apparatus for a vehicle seat, comprising:
   a detection element for sensing a signal indicative of presence of a child seat mounted in said vehicle seat, and for receiving electric energy via said signal;
   a child seat evaluation electronics unit for determining presence of a child seat based on said signal detected by said detection element; and
   an overload protection circuit coupling an output of the detection element to an input of said evaluation electronics unit, said overload protection circuit having
   first and second input connections for receiving an input voltage signal;
   a first and second output connections for providing an output voltage signal;
   a first circuit path connecting the first input connection and the first output connection;
   a second circuit path between the second input connection and the second output connection, and including a source/drain path of a first field-effect transistor for blocking the second circuit path when an overvoltage is present;
   a third circuit path between the first circuit path and a connection of the first field-effect transistor which is coupled to the second input connection; and
   a second field-effect transistor having a source/drain path arranged in the third circuit path, which completes the third circuit path if an overvoltage is present between the first and the second input connection; wherein
      a gate connection of the first field-effect transistor is connected to a potential in the first circuit path between the first input connection and the first output connection; and
      a gate connection of the second field-effect transistor is connected to a potential in the second circuit path between the second output connection and a connection of the first field-effect transistor which is coupled to the second output connection.

* * * * *